United States Patent [19]

Johnson et al.

[11] 4,351,593

[45] Sep. 28, 1982

[54] METHOD AND APPARATUS FOR SELECTIVE POSITIONING OF SPECTRAL FILTER DURING EXPOSURE CONTROL

[75] Inventors: Bruce K. Johnson, Andover; George D. Whiteside, Lexington, both of Mass.

[73] Assignee: Polaroid Corporation, Cambridge, Mass.

[21] Appl. No.: 108,219

[22] Filed: Dec. 31, 1979

[51] Int. Cl.³ ............................................. G03B 7/087
[52] U.S. Cl. .................................... 354/27; 354/33; 354/59; 354/149; 250/482.1; 356/225
[58] Field of Search .................................. 354/27–30, 354/26, 33, 34, 38, 42, 43, 49, 50, 59, 128, 139, 149; 350/1.1, 1.2, 1.3, 1.4, 195, 196, 314; 250/482, 226, 237 R; 356/215, 224, 225

[56] References Cited

U.S. PATENT DOCUMENTS

| | | | |
|---|---|---|---|
| 2,015,261 | 9/1935 | Eckler . | |
| 2,380,216 | 7/1945 | Carter . | |
| 2,841,064 | 7/1958 | Bagby et al. . | |
| 2,926,562 | 3/1960 | Bretthauer et al. . | |
| 3,006,265 | 10/1961 | La Rue . | |
| 3,035,503 | 5/1962 | Lee . | |
| 3,053,159 | 9/1962 | Bagby et al. . | |
| 3,173,347 | 3/1965 | Stimson et al. . | |
| 3,176,599 | 4/1965 | Anwyl ................................... 95/10 |
| 3,208,363 | 9/1965 | Easterly et al. ..................... 95/11 |
| 3,229,569 | 1/1966 | Frost et al. . | |
| 3,270,638 | 9/1966 | Anwyl et al. ........................ 95/10 |
| 3,314,349 | 4/1967 | Koeber ................................ 95/12.20 |
| 3,468,228 | 9/1969 | Rogers ................................ 95/12.20 |
| 3,536,408 | 10/1970 | Norwood ............................ 356/219 |
| 3,583,299 | 6/1971 | Land .................................... 95/10 |
| 3,589,258 | 6/1971 | Koeber ............................... 352/141 X |
| 3,661,466 | 5/1972 | Stimson et al. .................... 356/217 |
| 3,672,281 | 6/1972 | Land .................................... 95/42 |
| 3,709,615 | 1/1973 | Blakeslee .......................... 356/224 |
| 3,785,265 | 1/1974 | Lardeau . | |
| 3,832,722 | 8/1974 | Douglas ............................. 354/29 |
| 3,856,418 | 12/1974 | Levin . | |
| 3,896,458 | 7/1975 | Johnson et al. .................. 354/30 |
| 3,903,413 | 9/1975 | Manning ........................... 250/226 |
| 3,942,183 | 3/1976 | Whiteside ......................... 354/29 |
| 4,040,070 | 8/1977 | Hochreiter et al. ............. 354/29 |
| 4,040,072 | 8/1977 | Johnson et al. .................. 354/173 |
| 4,104,653 | 8/1978 | Johnson et al. .................. 354/27 |
| 4,147,418 | 4/1979 | Whiteside et al. ............... 354/27 |
| 4,156,564 | 5/1979 | Tsunekawa et al. ............. 354/29 |
| 4,160,588 | 7/1979 | Beach ................................ 354/31 |

FOREIGN PATENT DOCUMENTS 3036522 4/1981 Fed. Rep. of Germany .
3036522 4/1981 Fed. Rep. of Germany .

*Primary Examiner*—Gene Z. Rubinson
*Assistant Examiner*—S. D. Schreyer
*Attorney, Agent, or Firm*—Leslie J. Payne

[57] ABSTRACT

Method and apparatus usable for automatically controlling exposure of a photographic film by evaluating selected spectral scene light frequencies during certain ambient light portions of an exposure interval and evaluating additional spectral frequencies during a flash portion of the interval.

20 Claims, 10 Drawing Figures

METHOD AND APPARATUS FOR SELECTIVE POSITIONING OF SPECTRAL FILTER DURING EXPOSURE CONTROL

BACKGROUND OF THE INVENTION

This invention relates generally to the photographic field and, more particularly, an improved method and exposure control system for automatically and selectively controlling the filtering of light incident upon a photoresponsive element during exposure.

Automatic light responsive control systems are well known in the photographic arts. Essentially, these systems evaluate scene brightness levels of illumination for controlling exposure parameters, including effective aperture size and exposure interval, as a function of scene brightness evaluated against the sensitometric characteristics of the film being used. Typically, scene brightness evaluation is performed with light-measuring circuits including one or more photoresponsive elements.

One such automatic exposure control system employs scanning type shutter blades. Exemplary scanning shutter blades usable in exposure control systems are generally disclosed in U.S. Pat. No. 3,942,183, issued Mar. 2, 1976, to George Whiteside; and U.S. Pat. No. 4,104,653, issued Aug. 1, 1978, to Bruce K. Johnson et al., all of which are presently assigned with the present application. As described in these patents, there are cooperating pairs of primary and secondary apertures formed in the shutter blades. These pairs of apertures cooperate respectively for blocking and unblocking the passage of light through an exposure opening to a film plane and through a photocell opening to a light sensing or photoresponsive cell used for controlling blade positioning. During the exposure cycle, the secondary apertures operate in conjunction with the photocell and a control circuit to define both the aperture values achieved and the exposure interval as a function of the amount of light received through the secondary apertures. In such systems, photoresponsive elements of the silicon type are commonly used because they, among other things, have excellent long term stability and linearity of output signal with input light power changes.

For optimizing the quality of the resultant photographs when using automatic exposure control systems, such as the type noted, it is known to employ spectral correction filters to correlate the spectral sensitivity curve of the photoresponsive element more closely with that of the photographic color film. Without such a filter, the photocell would react to the light frequencies, such as infrared (IR), and cause the control circuit to terminate exposure earlier than desired. This is especially the case when the photocell is of the silicon type, because such a photocell tends to be red (IR) sensitive. For providing the desired correction, a spectral correction filter is interposed in the photocell's optical path, for example, as described in U.S. Pat. No. 3,903,413, issued on Sept. 2, 1975, to Monis Manning; and commonly assigned with the present application. This patent discloses use of a silicon photodiode, sensitive to radiant energy between about 350 nm and 1200 nm, whereas the sensitivity of typical color photographic film is confined to the visible region of the spectrum, i.e., from about 400 nm to about 700 nm. Use is made of a spectral correction filter with peak absorption in the near-infrared region (700-1200 nm) and high transmission in the visual region to correct or generally match the spectral response of the photocell in relation to the film. This matching of sensitivities is particularly useful in cameras employing diffusion transfer photographic processes of the so-called "instant photography" type where errors in the exposure cannot be later compensated for as is possible with film subsequently developed in a photographic laboratory.

While use of infrared filters serve satisfactorily, complications can arise when reflectivities of different objects in photographic scenes exhibit widely disparate values, for example, where the exposure of the subject's facial skin is adversely affected because of the widely disparate reflectivities of the surrounding clothing or other objects, particularly in close-up situations. Partly as a result of this, it has been found advantageous to remove the infrared filter in flash exposure modes of operation.

Consequently, although retention of spectral correction filter in the photocell's optical path has been practiced during both ambient and artificial illumination modes, as disclosed in U.S. Pat. No. 4,040,070, issued on Aug. 2, 1977, to W. Hochreiter et al., a spectral correction filter is removed from the photocell's optical path when the flash mode is desired. This removal is achieved, upon attaching a flash unit to the camera, by actuation of a relatively complicated mechanical arrangement which swings the filter out of the optical path.

Still other known prior art is described in U.S. Pat. No. 3,468,228, issued on Sept. 23, 1969, to Howard G. Rogers, which provides automatic sequential positioning of a pair of dual filters over photocell and exposure apertures to attain a color balanced exposure of photosensitive material.

SUMMARY OF THE INVENTION

In accordance with the present invention, an improved method and apparatus automatically controls exposure of a photographic film in accordance with selected spectral scene light frequencies during a predominantly ambient portion of an exposure and additional or other spectral frequencies of scene light during a flash portion of the exposure.

In the illustrated embodiment, there are provided means for mounting photographic film material at a given focal plane and a light exposure opening for allowing passage of light to the film and to detecting means for evaluating scene light; a flash means for illuminating the scene; and a blade mechanism mounted for displacement between first and second positions for defining an exposure interval and both changing primary aperture values over the exposure opening and changing secondary aperture values over the detecting means as the mechanism moves toward its second position. Selectively actuatable drive means are provided for initially displacing the blade mechanism from the first position toward the second position, and in response to the amount of scene light detected by the detecting means for firing the flash means and for also returning the blade mechanism to the first position.

Filtering means operatively associated with the detecting means cooperate with the blade mechanism during relative movement therebetween to generally preclude transmission of preselected frequencies of scene light during at least a certain portion of the exposure interval and generally allow transmission of these frequencies during other portions of the interval.

Among the objects of the invention are, therefore, a method of providing an improved photographic exposure control process; a method of providing improved flash photography; and the provision of photographic apparatus having an improved exposure control system including a spectral filter and blade mechanism which operatively cooperate to effect selective filtering of the scene light admitted to the photoresponsive element as a function of the scene light.

Other objects and further scope of applicability of the present invention will become apparent from the detailed description to follow when taken in conjunction with the accompanying drawings in which like parts are designated by like reference numerals.

DETAILED DESCRIPTION

Figure 1:
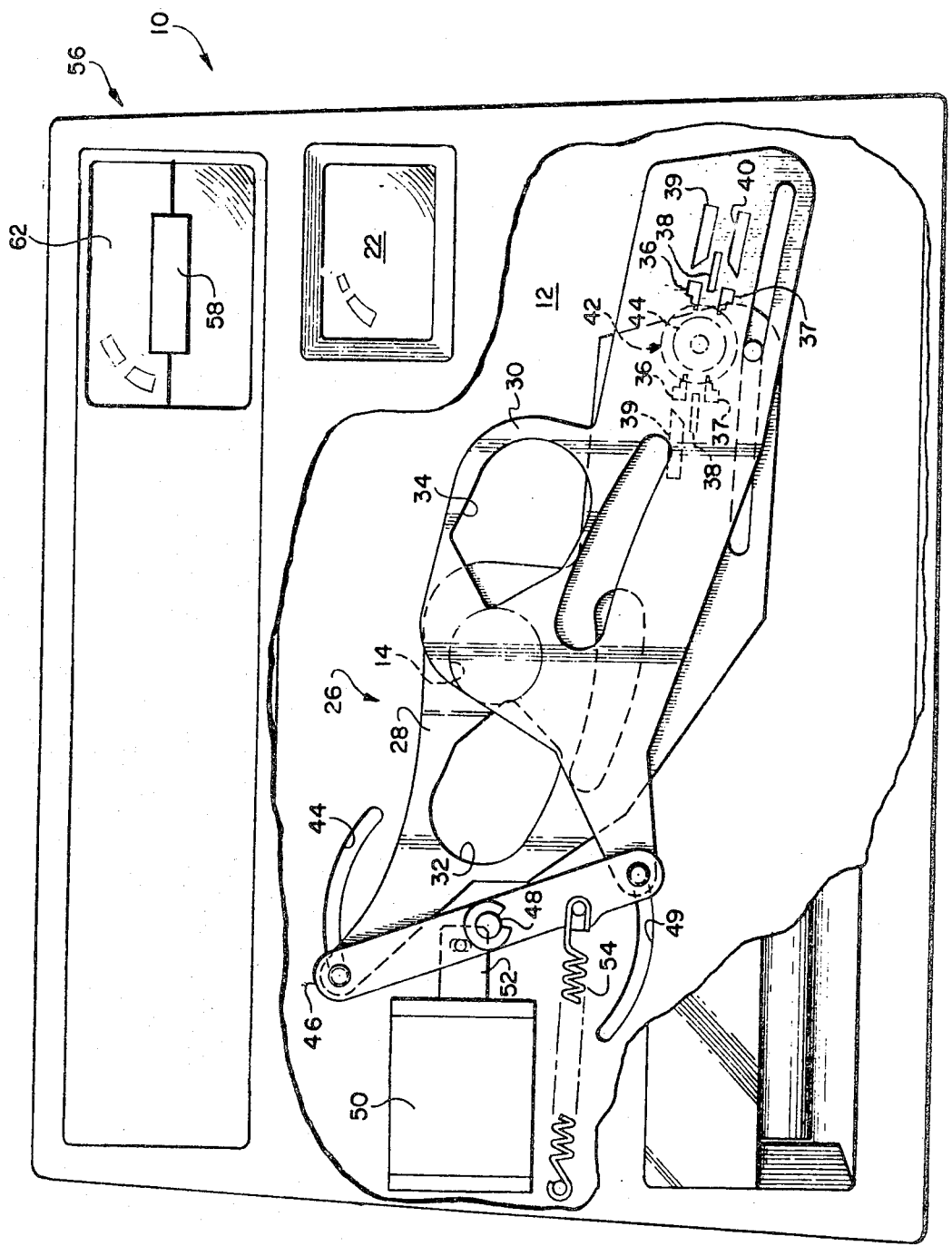
FIG. 1 is a diagrammatic front view in elevation depicting a photographic camera incorporating the improved exposure control system of this invention including a blade mechanism illustrated in a closed condition.

Referring now to FIG. 1, it can be seen that the improved exposure control system of this invention is contained within a housing of photographic camera 10. Included within the camera housing 10 is a rear block casting 12 constructed to support components of the exposure control system. A light exposure aperture 14 is centrally formed in the casting 12 and defines the maximum available exposure aperture of this control system as well as allows passage of scene light to a photographic film unit (not shown) of a film pack 16. Examples of such a film pack 16 are described in U.S. Pat. Nos. 3,543,662; 3,705,542; 3,748,984 and 3,779,770. Each of the film units of the pack 16 is successively positioned at the focal plane F of the camera. It is noted that the camera is of the self-developing type usable with a film pack of the type manufactured and sold by the Polaroid Corporation as the Polaroid SX-70 Land film pack.

Mounted on a front wall of the housing 12 is a taking or objective lens 18 of the fixed focus type. The taking lens 18 focuses the image carrying rays from the scene to be photographed along an exposure path to a mirror 20. Although the described lens 18 is illustrated as a fixed focus type, an adjustable lens assembly is also contemplated as a substitute therefor. From the mirror 20, the rays are reflected to the uppermost film unit of the film pack 16. Additionally, a viewing window 22 is located in the front face of the camera housing 10 and operates in conjunction with a viewing system 24 for permitting viewing and framing of the scene to be photographed by the operator. Control of the exposure path is provided by the improved exposure control system 26.

Although the above exposure control system is described for use with photographic cameras of the non-reflex type, the intended scope of this invention is by no means so limited. Accordingly, cameras of the well-known reflex type, such as described in U.S. Pat. No. 3,672,281, entitled "Reflex Camera", by E. H. Land, commonly assigned herewith, may be equally suitable for embodying the exposure control system of this invention.

Reference is now made to FIGS. 1–5 for better showing the constructional and positional arrangement of the exposure control system 26. Included in this system 26 is a blade mechanism having overlapping shutter blade elements 28 and 30. With particular reference to FIGS. 1 and 6, the shutter blades 28 and 30 are supported in the block casting 12 intermediate the objective lens 18 and the light entering exposure opening 14. A pair of scene light admitting primary apertures 32 and 34 are provided, respectively, in the blade elements 28 and 30. In use, the primary apertures 32 and 34 coincide and overlap progressively over the light entering exposure opening 14 to define progressively increasing primary aperture values as a function of blade positioning during an exposure interval.

The shutter blades 28 and 30 additionally include a pair of secondary apertures, each consisting in the illustrated embodiment of a plurality of apertures such that the blades have a plurality of sets of sweep secondary apertures generally indicated by reference numerals 36, 37, 38, 39, 40. In operation, the sets of secondary apertures 36, 37, 38, 39, 40 move in correspondence with the primary apertures 32, 34 to progressively coincide so as to define progressively varying and distinct sets of secondary aperture values as a function of blade positioning during exposure. As will be explained in greater detail, the sets of secondary sweep apertures 36–40 cooperatively coincide with each other and with a spectral filter 41 (FIG. 6) to effectively and automatically control the intensity and spectral frequency of scene light passing to a light detecting station 42 as a function of blade positioning during the exposure interval. This light detecting station 42 includes a photoresponsive device or photocell 44 aligned with a photocell light entry window (not shown) in the housing 10. Preferably, the photocell 44 is of the silicon photodiode type. Also, included in the light detecting station 42 is a control circuit (not shown) for collectively operating with the photocell 44 for terminating the exposure interval as a function of time integration of the intensity of light incident upon the photocell 44 as permitted by the overlapping sets of photocell sweep apertures 36–40.

An exposure control system embodying the abovedescribed light detecting station 42 is described in the commonly assigned copending U.S. patent application Ser. No. 74,993, filed on Sept. 13, 1979. Since the light detecting station 42 does not per se form an aspect of the invention, only those details needed for an understanding of the present invention will be given. Also, for greater details of the construction and operation of the blade mechanism, reference is made to commonly assigned U.S. Pat. No. 3,942,183. Since the blade mechanism does not by itself form an aspect of the invention, only a description of its construction necessary for a complete understanding of this invention will be set forth. In this regard, it will be understood that distal ends of the shutter blades 28, 30 are pivotally connected to distal ends of a walking beam 46. The walking beam 46 is pivotally connected to the block casting 12 by a pivot pin 48 and its distal ends have pin members extending through respective circular openings in the respective blade elements which pins slidably engage respective arcuate slots 49 formed in the rear casting 12 for prohibiting shutter blade disengagement during exposure control operations.

Displacement of the shutter blades 28, 30 relative to each other and to the light detecting station 42 and to the spectral filter 41 is provided, in part, by a tractive electromagnetic device or solenoid 50. Such solenoid 50 includes an internally arranged and movable cylindrical plunger unit 52 which retracts upon solenoid energization. This plunger unit 52 is affixed to the walking beam 46 by means of a pivot pin or stud. Thus, longitudinal displacement of the plunger unit 52 is effective to rotate the walking beam 46 about the pivot pin 48 and in so doing cause appropriate displacement of the shutter blades 28, 30; as will be described more fully.

For continuously urging the primary apertures 32, 34 and the sets of secondary sweep apertures 36-40 to positions defining their effective apertures, there is provided a biasing spring 54. One end of the spring 54 is affixed to the block casting 12 while its opposite end is attached to the walking beam 46. As should be understood readily, the exposure control system 26 is also applicable to photographic systems wherein the blades 28, 30 are spring biased to a normally closed position.

For purposes of battery power conservation, it is undesirable to have the solenoid 50 continuously energized to maintain the shutter blades 28, 30 in the scene light blocking conditions (FIG. 1) when the camera is not in use. Towards this end, there is provided a latch mechanism (not shown) operable automatically at the end of each exposure for latching the walking beam 46 in the scene light blocking position. Thus, the solenoid 50 is deenergized when the blades 28, 30 are in the scene light blocking condition. Unlatching of the latch mechanism commences upon exposure. Details of this latching mechanism including its operation do not per se form an aspect of this invention; therefore, reference is made to U.S. Pat. No. 4,040,072, issued Aug. 2, 1977, and assigned in common herewith for a more complete description thereof.

Reference is now made to the flash strobe unit 56 of the present embodiment. In essence, the electronic flash strobe unit 56 is cooperatively associated with the photographic camera apparatus to contribute a predetermined proportion, i.e., fill flash of the scene light admitted by the shutter blade mechanism to expose the film in a manner to be subsequently described. Since this type of fill flash does not per se form an aspect of the present invention, only those details necessary for an understanding of the present invention will be described.

However, a more detailed description of the electronic flash apparatus is given in the aforementioned copending application Ser. No. 74,993. The electronic flash strobe unit 56 is affixed to an upper surface of the camera housing 10. Included in the unit 56 is a flash discharge tube 58 located in a suitable reflector 60 behind a lens 62. A quench tube (not shown) is provided for interrupting the flash discharge of the flash discharge tube 58 and electric power for the electronic flash strobe unit 56 is provided by a battery (not shown) carried in the film pack 16.

As described in the above-mentioned application, the output signal from a light integrator circuit (not shown) of the scene light detecting station 42 is directed to three level detector circuits (not shown) which all may be of a well-known design, such as a Schmitt trigger. The output from one of these level detectors controls a flash fire trigger circuit (not shown) of the electronic flash unit 56. The second level detector is effective to control the energization of the solenoid 50, and the third level detector is effective to control a flash quench circuit (not shown).

For purposes of illustrating operation of the flash unit 56, the level detector which controls energization of the solenoid (to close the shutter) is configured to trigger at 1.0 volt, which is a normalized value representative of a select or optimum film exposure value for a predetermined film speed; the level detector for controlling the quench trigger circuit is set to trigger at 1.2 volts; and the level detector for controlling the flash fire trigger circuit is set to trigger at 0.75 volts. Reasons for these relationships are more adequately described in the noted copending application. These values will, however, later serve to better describe the present invention. Also, a flash time delay circuit (not shown), which receives an input signal upon the deenergization of the solenoid 50, is included to provide a time delayed flash fire signal operative to trigger the flash under very low ambient light conditions as later explained in detail. The time delay provided by the flash delay circuit may be in the order of 65±4 msec. Finally, a shutter time out circuit (not shown) is also provided as described in the noted copending application.

Operation of a camera actuator button (not shown) powers up the camera 10, enables the strobe unit 56 for subsequent firing and releases the shutter latch mechanism to allow shutter blade movement to commence the exposure cycle. More specifically, the shutter blades 28 and 30 move in opposite directions from the scene light blocking condition of FIG. 1 toward the maximum primary aperture value shown in FIG. 4. Thus, the effective aperture area over the light entering exposure opening 14 is enlarged progressively.

Simultaneously with enlarging primary aperture values, the secondary photocell sweep apertures define a corresponding progressively enlarging secondary effective aperture opening over the light detecting station 42. In this embodiment, the effective photocell sweep aperture value defined by the overlapping secondary apertures tracks ahead of or leads the effective scene light admitting primary aperture defined by the overlapping primary apertures 32 and 34 to anticipate in a well-known manner for the additional scene light admitted to the film plane during the finite time required to drive the shutter blades 28, 30 from the scene light unblocking arrangement of FIGS. 2 and 4 back to the scene light blocking arrangement of FIG. 1, as is more fully described in U.S. Pat. No. 3,896,458, entitled "Automatic Exposure Control System", issued July 22, 1975, in common assignment herewith and now incorporated by reference herein.

The photocell 44 provides a time varying response representative of the time integration of the scene light intensity incident to the photocell. Under conditions of moderate to high scene light, when the integration signal reaches 0.75 volts, the flash level detector triggers firing of the flash discharge tube 58 in a well-known manner. Assuming the photographic subject is within the effective range of the flash, there will be an immediate and substantial increase in the reflected scene light to which the detecting station 42 will respond to provide the required voltages to trigger the second and third level detectors for respectively effecting re-energization of the solenoid 50 and quenching the flash tube. Thus, the shutter blades 28, 30 move back to the scene light blocking arrangement as shown in FIG. 1, and the exposure interval is terminated.

In regard to the exposure control, it should be noted that with diminished intensity of scene light, the flash unit is fired at later times such that the flash is fired at larger primary and secondary aperture values. Moreover, under conditions of extremely low or negligible ambient scene light intensity, the light integrator circuit will not provide a 0.75 volt output response prior to the expiration of the 65±4 millisecond flash time delay. For these conditions, a signal is transmitted by the flash delay circuit at the expiration of the noted time delay to effect flash firing. Moreover, in the event that there is neither sufficient available ambient scene light and/or artificial flash light for the output signal from the light integrator to reach 1 volt, the shutter time out circuit operates to energize the solenoid 50 and thereby limit the maximum exposure interval to, for example, 100 milliseconds. In this manner, the camera apparatus of this invention is provided with an electronic flash together with means for controlling the energization of the electronic flash to assure that a predetermined proportion of a select film exposure value will be attributable to the artificial light provided by the electronic flash at least when a subject is within the effective camera-to-subject distance range of the flash.

Reference is again made to FIGS. 1-6 for better describing the structural and functional interrelationship between the shutter blades 28, 30, spectral filter 41 and the photocell 44.

With particular reference to FIG. 6, the photocell 44 is seen to include a photocell lens 64 and linearly spaced therefrom a silicon photocell detector 66 which produces a current output when subjected to incident radiation. In the illustrated embodiment, the photocell lens 64 is of the defocusing type. The photocell lens 64 is in optical alignment with the photocell light entry window (not shown) in the front face of the camera housing 10 and receives the scene light passing through the sets of secondary apertures. Positioned intermediate the photocell lens 64 and the silicon photocell detector 66 is the pair of scanning shutter blades 28, 30. Positioning of the shutter blades 28, 30 relative to the photocell lens 64 is carried out to insure that the secondary sweep apertures 36-40 direct preselected portions of spectrally filtered scene radiation passing through the filter 41 to the photodetector for purposes subsequently explained.

For purposes of carrying out the selective attenuation of spectral energy, this embodiment has the rear face of the photocell lens 64 partly covered with a coating effective for blocking infrared radiation (IR). This coating is in the form of an annulus, such as best shown in FIG. 6. Since the center portion 68 of the photocell lens 64 is unfiltered, it will allow IR radiation to the photocell detector 66 as well as the visible spectral energy. The significance of this relationship in modifying exposure control will be explained subsequently. It should be noted that the center portion 68 may also be provided with another lens (not shown) for further assisting in directing scene light to the photocell detector 66.

Referring back to the blocking IR filter 41, it is fabricated to attenuate spectral energy within the broad wavelength range to which the photocell detector 66 is sensitive (e.g., 360-1200 nm) and, preferably, to remove substantially all the spectral energy in the IR region (e.g., 700-1200 nm) of the photocell range. Thus, visible spectral energy remains after passing the IR filter 41. Control of the photometric response by selective filtering and nonfiltering of the radiation incident upon the photodetector 66 is accomplished by the unique cooperation between the photocell lens 64, spectral filter 41 and the sets of secondary sweep apertures 36-40.

Figures 2, 2A:
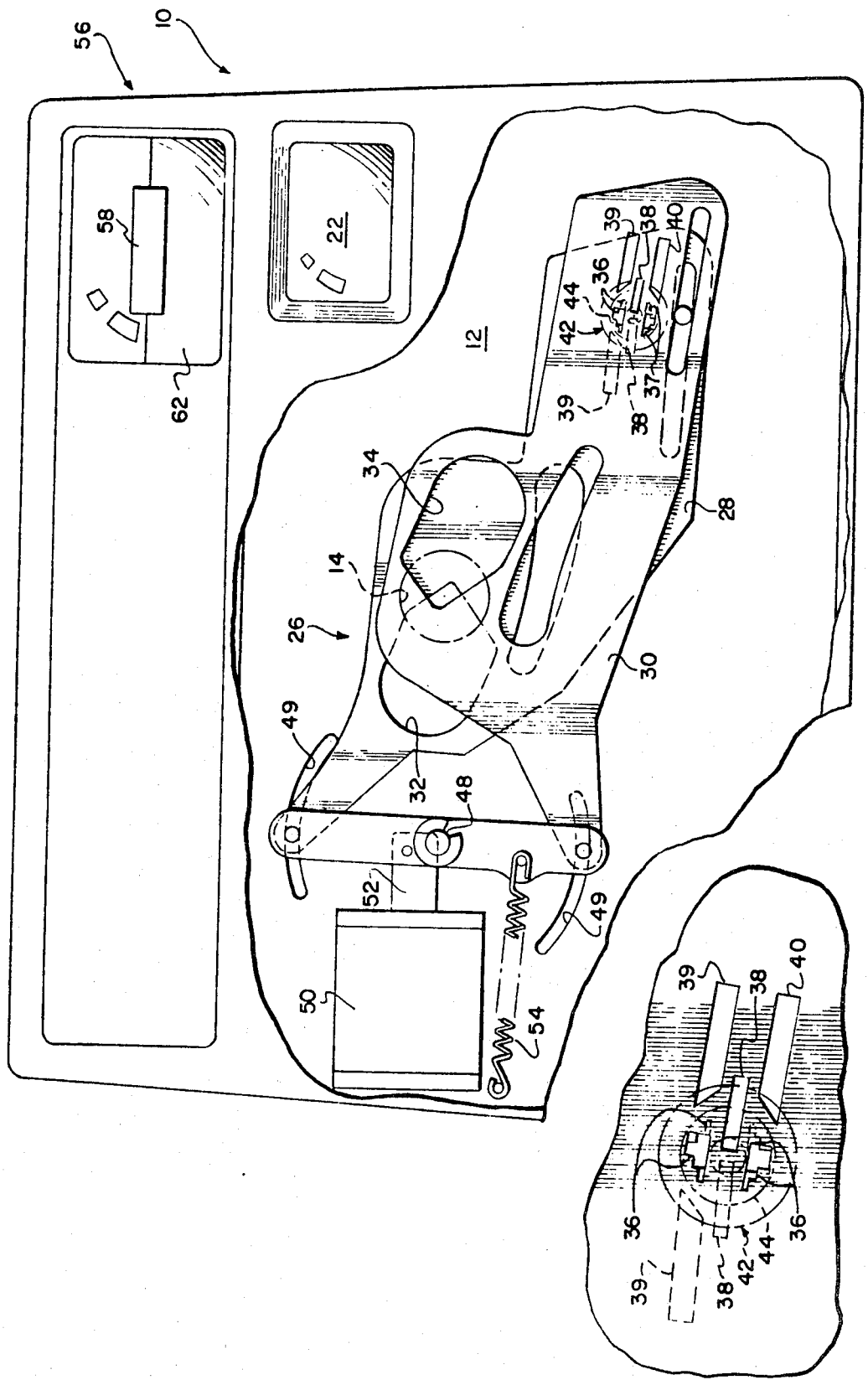
FIG. 2 is an elevational view diagrammatically depicting the blade mechanism of FIG. 1 in an initially open condition during operation.
FIG. 2A is an enlarged fragmentary view illustrating in greater detail the cooperative relationship of the secondary sweep apertures with respect to the spectral filter when in the position shown in FIG. 2.
Figure 3:
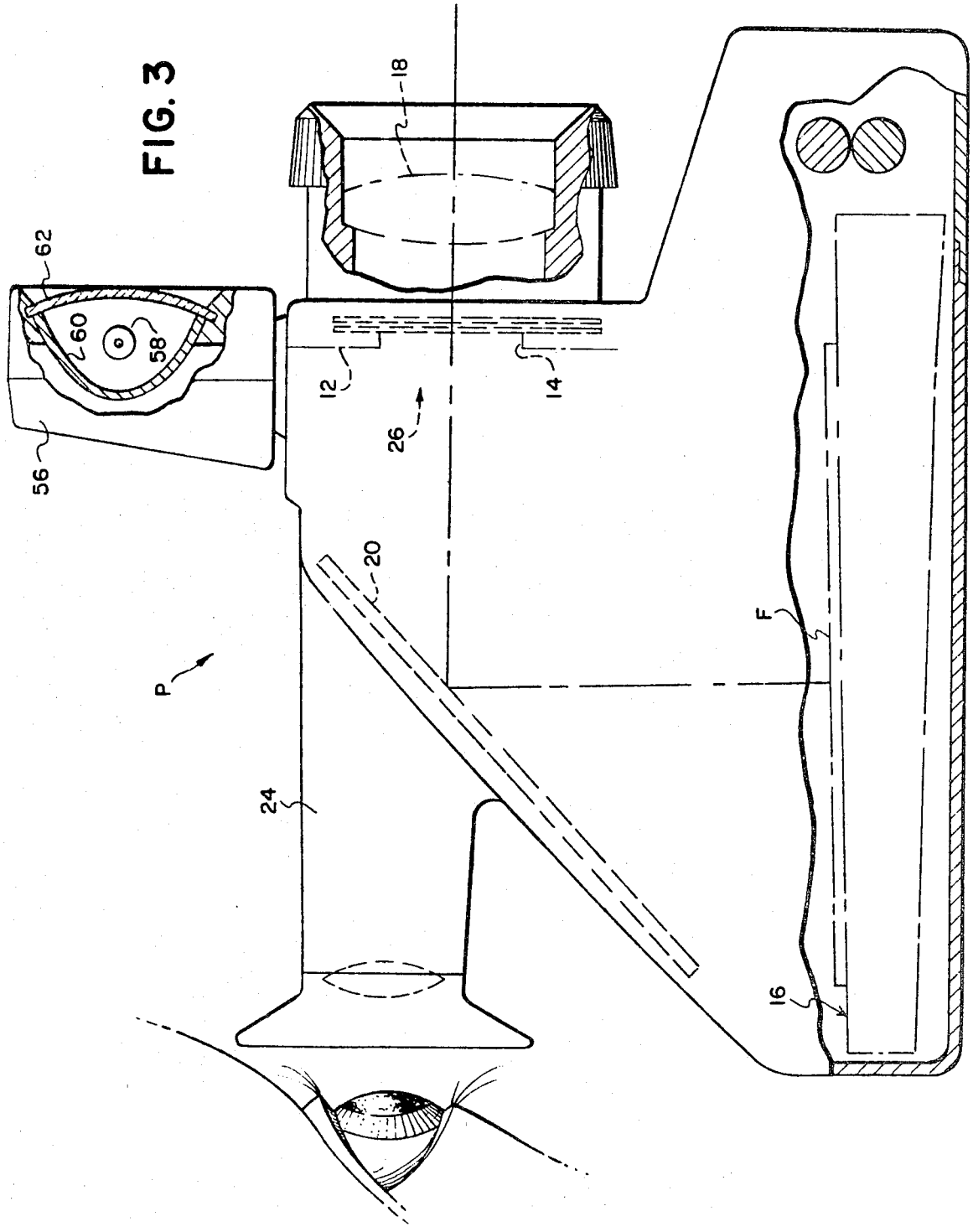
FIG. 3 is a side elevational view diagrammatically showing the improved exposure control system of this invention.
Figure 4:
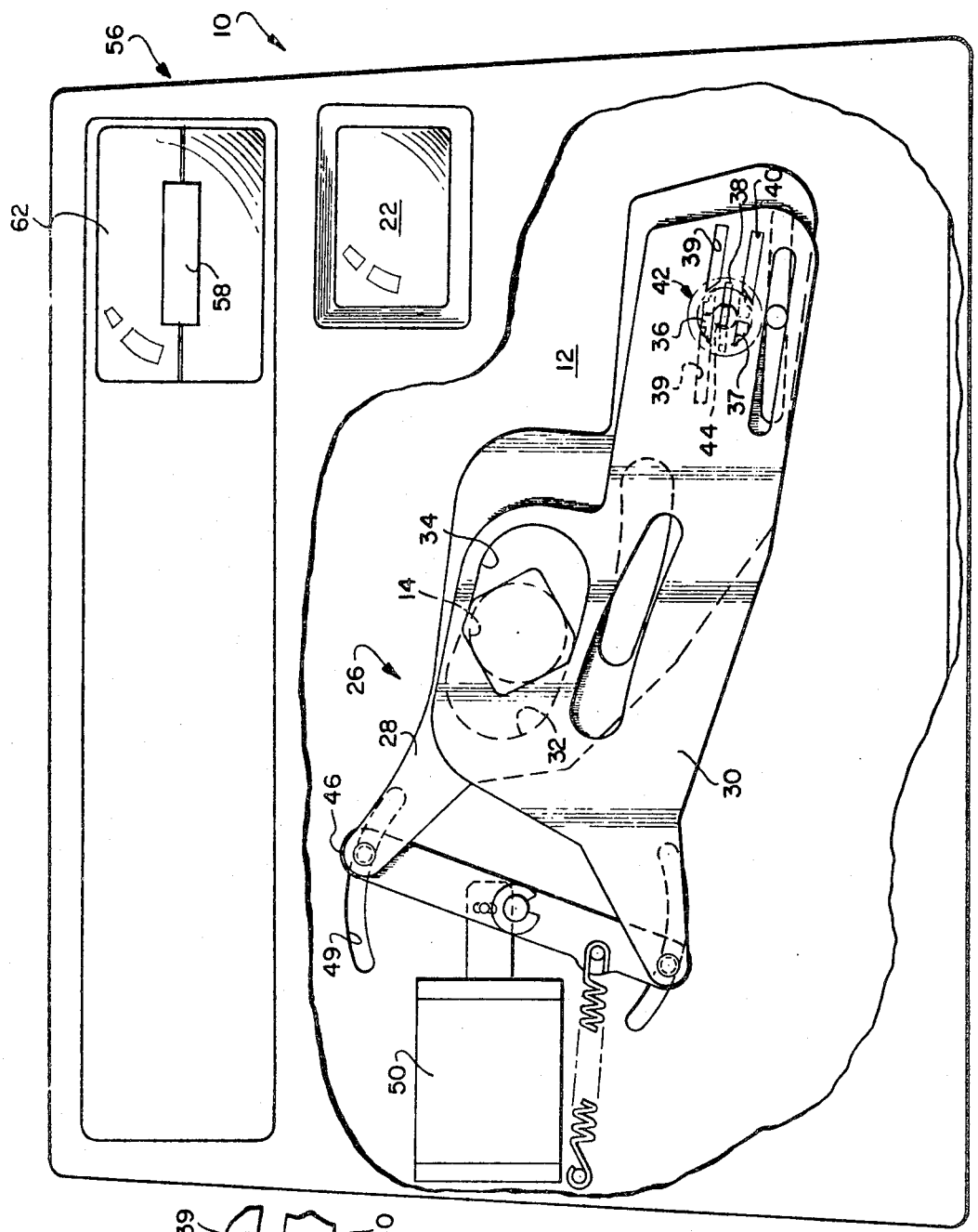
FIG. 4 is a view similar to FIG. 2 but showing the blade mechanism of FIG. 1 in a more open arrangement.
Figure 4A:
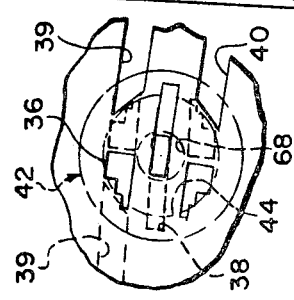
FIG. 4A is an enlarged fragmentary view showing the secondary sweep apertures in a position relative to the spectral filter when in the position shown in FIG. 4.

Prior to describing the filtering operation in detail, it should be first explained that the novel arrangement automatically provides IR filtering of the photocell input at moderate to high light levels since the ambient contribution is most important under such conditions, but under lower light levels permits passage of, and evaluation of, the IR because the flash illumination is then of greater importance to the resulting photograph. Broadly, the secondary apertures in conjunction with the filter 41 provide means for substantially permitting transmission of selected frequencies during one portion of the blade scan and, hence, the exposure interval while precluding transmission of the same frequencies during another portion; at least when the scan reaches large aperture values under low light conditions. As shown in FIG. 2, the pairs of photocell sweep apertures 36, 37, during initial shutter blade sweep from the light blocking condition of FIG. 1 to the condition shown in FIG. 2, progressively cooperate to pass only scene light passing through the annular filter 41. The filter 41 acts, of course, to block the IR while the opaque portion of the shutter blades 28, 30 block passage of unfiltered light through the center portion 68. It is envisioned that this relationship of the shutter blades 28, 30 will be at positions corresponding to moderate-to-high ambient light conditions and correspond to primary aperture values less than their maximum. With the scene light being filtered by the IR filter 41, the potential of overexposing blue sky is eliminated. As noted in the copending application, a flash will be fired during this exposure and the reflected light thereof evaluated in accordance with the invention without the benefit of IR radiation, however, since the flash contribution under these levels of ambient light is not controlling, the lack of precise flash accuracy is tolerated in favor of ambient control.

Under conditions wherein ambient light is very low, the photocell detector 66 in cooperation with the light integrating circuit reenergize the solenoid 50 at a later time to terminate exposure. Therefore, under low ambient light conditions, the shutter blades 28, 30 sweep beyond their position in FIG. 2 and ultimately to the position shown in FIG. 5, and in doing so the central secondary sweep apertures 38 progressively coincide over the ulfiltered portion 68 to define sweep aperture values which allows transmission of infrared spectral energy to the photocell detector 66 as well as the visible spectral energy while the aperture values defined by the secondary sweep apertures 36, 37 eventually terminate. As a result, in moving from the blade position of FIG. 2 to that of FIG. 5, the spectral filtering is rapidly diminished, and in fact, eliminated by means of masking elements as explained below. Under the latter condition, the primary apertures 32, 34 define their maximum effective diameter.

Figure 6:
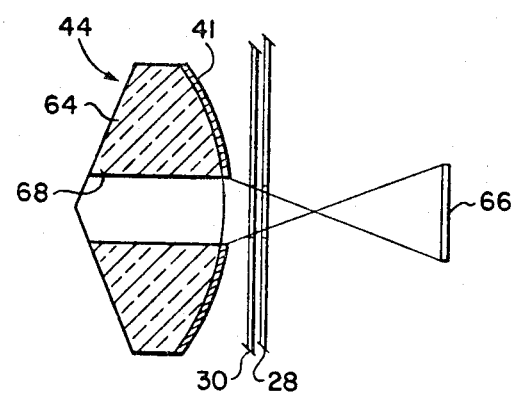
FIG. 6 is a diagrammatic view depicting the relationship of the blade mechanism and spectral filter of the improved exposure control system.
Figure 7:
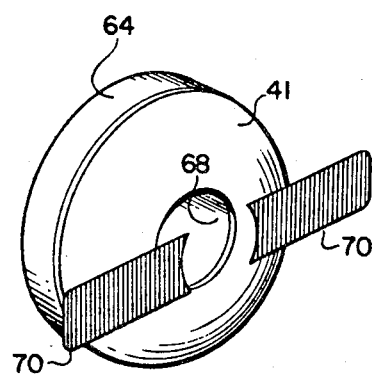
FIG. 7 is a diagrammatic perspective view showing the relationship of the masking members to the spectral filter.

Since the secondary sweep aperture value defined by the central sweep apertures 38 will, when in coincidence, overlie a portion of the annulus 41 and thereby allow light to pass through the filter 41, the masking elements 70 (FIGS. 6 and 7) are provided. These masking elements 70 may be connected to the camera housing 10, the lens 64, or any camera portion so as to fixedly be in position to the light path to the photocell. In this regard, the pair of masking elements 70 essentially straddle the unfiltered central portion 68 and have their terminal ends with arcuate formations to match the curvature of such central portion. Thus, the masking elements 70 block filtered scene light passed through the filter 41 and the central sweep apertures 38 from reaching the photocell detector 66. The exposure control system 26 can also operate without the masking elements 70 since the effect of such slight blocking of the IR leakage on film exposure during transition can be minimized for practical purposes. Further, the filter 41 can also be constructed as a pair of annular segments mounted at the top and bottom of the lens 64 as viewed in FIG. 7.

Since, under high ambient conditions, the blade scan is terminated early, only the sweep apertures 36 and 37 provide aperture values over the photocell. Hence, the absorption filter 41 blocks, or precludes transmission of, IR radiation from the scene at such time. However, with lower ambient light levels, the secondary apertures 38 come into coincidence over the unfiltered opening 68 (while apertures 36 and 37 pass out of coincidence) as larger exposure values are formed. Accordingly, the shutter blades 28, 30 move to the position shown in FIG. 4 where the filterless opening 68 is employed for transmission to the photocell detector. Consequently, in the latter case, the scene light incident upon the photocell 44 is selectively filtered to block IR during the initial portion of the displacement of the shutter blades 28, 30 or that is, an initial portion of the exposure interval and then becomes unfiltered as openings 38 coincide so that the photocell then responds to both IR and visible radiation during this subsequent portion of the displacement.

Hence, it should be understood that the filter 41 in conjunction with the blade mechanism provides means for automatically permitting transmission of selected frequencies of light to the sensing or detecting means during at least one portion of the displacement of the blade mechanism or, that is, one portion of the exposure interval while substantially precluding transmission of the selected frequencies to the sensing means during another portion thereof.

Consequently, in accordance with this invention when the flash unit 56 is fired in situations of somewhat low ambient scene light (where the flash contribution to the resulting photograph is predominant as compared to the ambient contribution), the shutter blades 28, 30 will, during scanning, be positioned during the strobe flash with apertures 38 in coincidence so that the IR filter 41 is not in spectral filtering relationship to the photocell 44. Thus, the photocell 44 is no longer blocked from receiving IR radiation. As a result, during the early stages of blade displacement, prior to the flash, only visible light will be incident upon the photocell while at the later stages, during flash operation both visible and IR radiation are evaluated such that the earlier mentioned difficulties encountered with flash firings will be substantially overcome. In this regard, objects viewed in the visible spectral region exhibit widely different light reflectivities while the near infrared region (e.g., 750–1200 nm) is characterized by more uniform reflectivity for most common materials. Therefore, the IR reflectivity is mush less dependent on the visible color (specific visible light absorption), and objects viewed by infrared are relatively independent of the reflectivity disparities earlier described. Thus, in scenes where differences in the visible reflectivities are present or which can be exaggerated by light sources such as flash bulbs or strobes, it is highly desirable to evaluate the IR radiation because, with such IR radiation, there will be less reflectivity differences between, for example, a subject's facial skin and the surrounding clothing or other objects. This substantially minimizes the degree of under or overexposure in such situations. It is, therefore, apparent that under flash conditions with exaggerated scene differences in reflectivities it is desirable to have the photocell detector respond to IR radiation.

Advantageously, in operation under high ambient light conditions, where the blades reach only small scanning aperture values, the novel system essentially precludes IR photocell reception and hence, IR evaluation. However, with lower ambient conditions, as the scan begins to reach larger aperture values, it reduces and subsequently eliminates IR filtering to provide unfiltered reception at these increased exposure values. Since the flash is fired at later rather than early stages of the scan, flash firing which assumes greater importance under lowered ambient conditions is thus coincident with the unfiltered reception. Consequently, for this lower ambient condition, the initial, primarily ambient portion of the exposure interval is evaluated under essentially only visible light while during the flash portion of the interval the evaluation employs both visible and infrared scene radiation.

Figure 5:
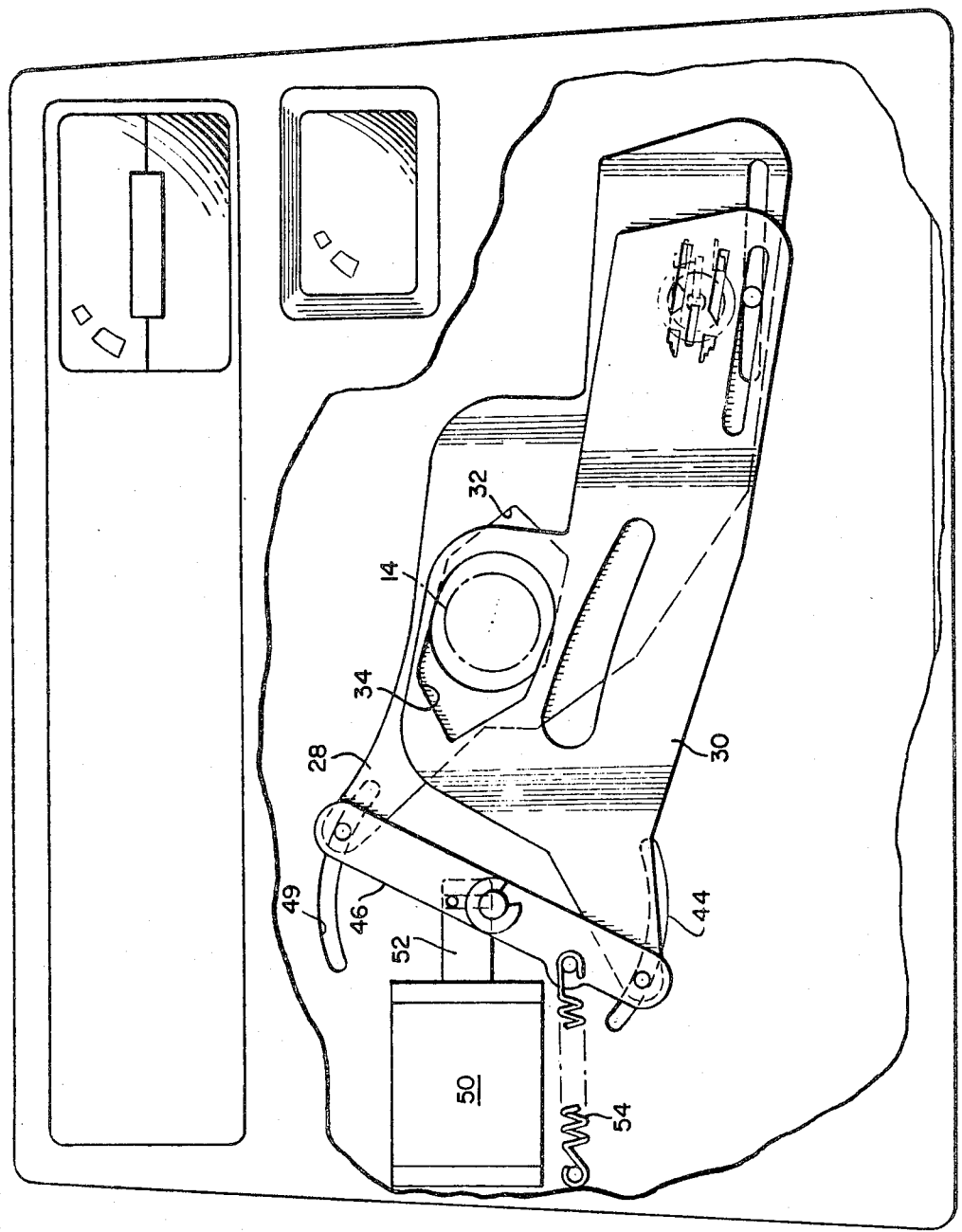
FIG. 5 is a view similar to FIG. 4, but showing the blade mechanism in its fully open arrangement.
Figure 5A:
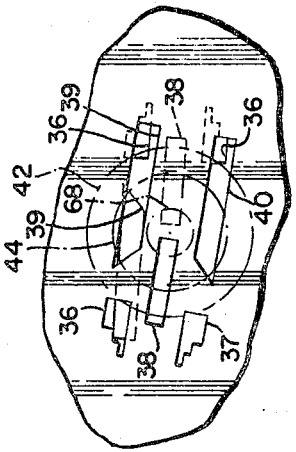
FIG. 5A is an enlarged fragmentary view showing the secondary sweep apertures in a position relative to the spectral filter when in the position shown in FIG. 5.

Finally, reference is made to the secondary sweep apertures 39, 40 which are arranged to travel in overlying relation to the IR filter 41 during final scanning of the blades 28, 30 to the terminal position as shown in FIGS. 5 and 5A. During this final stage of such scanning, each of the secondary apertures 39, 40 begin to coincide with the corresponding apertures 36, 37 in overlying relationship to the top and bottom, respectively, of the annular filter 41 (not shown). Thus, some of the scene light is filtered before the central apertures pass out of coincidence over the unfiltered portion 68. This corresponds to the primary apertures 32, 34 defining a maximum primary aperture value. While maintaining this maximum primary aperture, the shutter blades 28, 30 continue to move such that the central secondary apertures 38 pass out of coincidence; the scene light permitted to pass through to the photocell detector is filtered by the filter 41. When the central apertures 38 pass out of coincidence, the overlapping apertures 39 permit only scene light that has the IR blocked to be evaluated (See FIGS. 5 and 5A). This blade position occurs only when there is predominantly low ambient light such as during early morning or late evening where the flash effect is negligible, for example, when taking pictures of the Grand Canyon, objects in the scene are too remote to reflect a significant amount of flash intensity. Under such conditions, it is preferred to return to scene evaluation excluding IR radiation. Consequently, the IR absorption filter 41 is preferred for proper exposure. As explained in the aforementioned references, the blades 28 and 30 can continue to move while maintaining the maximum exposure value due to the fact that the primary aperture blades 32 and 34 are elongated with respect to the entrance aperture 14. Hence, the set of secondary sweep apertures 39 progressively coincide in overlying relationship to the top portion of the annular filter 41 as is shown in FIG. 5A while the maximum exposure value remains unchanged. As noted, this portion of an exposure interval only occurs when the ambient scene light is quite low such that it is desirable to reintroduce spectral filtering.

It will be appreciated that this invention envisions use of a photocell lens having the top half portion made so as to block or absorb IR frequencies while the lower half portion is made in a conventional lens fashion which can pass both IR and visible frequencies. The secondary sweep apertures would be, of course, formed so as to achieve the desired filtering control mentioned above during shutter blade scan or strobe. In this regard, for example, under high ambient light conditions an initial pair of cooperating sweep apertures would cooperate over the blocking IR filtered lens half; under relatively low ambient light conditions, another pair of sweep apertures could coincide over the non IR-filtered lens half, while the first noted pair of secondary apertures would terminate or close their effective sweep aperture area. Should light conditions dictate that the blades continue to sweep beyond the condition last noted, such as under low or negligible ambient light and wherein the subject is beyond the effective range of the flash, then a third pair of coinciding sweep apertures could pass in overlying relation to the IR filter lens half while the noted second pair of sweep apertures close or terminate their effective sweep aperture area. Thus, it will be understood, of course, that the foregoing arrangement is designed to control the exposure as did the previously described arrangement.

The light integrating unit provides an evaluation of scene radiation during an evaluation period which, in the illustrated embodiment, occurs essentially simultaneous with at least the initial stages of the exposure interval. Further, since the light integration only continues until a 1.2 volt level is reached, the actual length of the evaluation period is determined by the scene radiation; however, it should be understood that novel arrangements described herein are also applicable to pre-evaluation of scene lighting and to fixed periods of evaluation.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. In a photographic apparatus having means for directing image forming light rays from a scene along a given path to a photographic film material mounted at a given focal plane, means for evaluating radiation from said scene during an evaluation period, means for unblocking and blocking said path to provide an exposure interval during each part of which essentially the same given range of spectral frequencies are continuously transmitted from the scene to the focal plane, and means responsive to said evaluation means for controlling said unblocking means to define an exposure interval, the improvement wherein said evaluating means includes:
   means for substantially precluding evaluation of selected spectral frequencies during one portion of the evaluation period while substantially permitting evaluation of said selected frequencies during at least another portion of said period.

2. The camera of claim 1 including means for producing a flash of illumination during said another portion of said period.

3. In a photographic apparatus having means for directing image forming light rays from a scene along a given path to a photographic film material mounted at a given camera focal plane, means for sensing radiation from said scene, means for unblocking and blocking said path to provide an exposure interval during each part of which essentially the same given range of spectral frequencies are continuously transmitted from the scene to the focal plane, and means responsive to said sensing means for controlling said unblocking means to define an exposure interval of said film at a given exposure value, the improvement comprising means operatively associated with said sensing means for substantially precluding transmission of selected spectral frequencies during one portion of the exposure interval while substantially permitting transmission of said selected frequencies during at least another portion of said interval.

4. The apparatus of claim 3 wherein said selected frequencies are infrared frequencies.

5. The apparatus of claim 3 including means for producing a flash of illumination during said another portion of said period.

6. The apparatus of claim 4 wherein said another portion of said interval follows said one portion.

7. The apparatus of claim 3 wherein said transmission permitting and precluding means includes means for precluding transmission of said selected frequencies during an initial portion of an exposure interval, for permitting transmission of said selected frequencies during a subsequent portion, and for again precluding transmission of said selected frequencies during a remaining portion of the interval.

8. In an exposure control system for use in a photographic camera having means for directing image forming light rays from a scene along a given path to a photographic film material mounted at a given camera focal plane, said system having means for sensing radiation from said scene, means for unblocking and blocking said path to provide an exposure interval during each part of which essentially the same given range of spectral frequencies are continuously transmitted from the scene to the focal plane, and means responsive to said sensing means for controlling said unblocking means to define an exposure interval of said film at a given exposure value, the improvement comprising:
   means operatively associated with said sensing means for substantially precluding transmission of selected spectral frequencies during one portion of the exposure interval while substantially permitting transmission of said selected spectral frequencies during at least another portion of said interval.

9. The system of claim 8 wherein said selected frequencies are infrared frequencies.

10. The system of claim 8 wherein said another portion of said interval follows said one portion.

11. The system of claim 10 wherein said transmission precluding and permitting means includes means for again precluding transmission of said frequencies during a third portion of said exposure interval following said another portion.

12. A method of exposing photographic film comprising the steps of:
    summing scene illumination from a scene a first step of summing first spectral frequencies during an initial portion of an evaluation period and comprising a second step of summing second spectral frequencies different from said first frequencies at least during another portion of the evaluation period;
    initiating an exposure interval during each part of which essentially the same given range of spectral frequencies are continuously transmitted from the scene to the focal plane by directing image forming light rays from a scene to be photographed along a given exposure path to photographic film material located at a given focal plane;
    directing a flash of illumination at said scene during the exposure interval; and
    responsive to a total of both of said summing steps, blocking said given exposure path to terminate said exposure interval.

13. The method of claim 12 wherein said first summing step includes evaluating scene illumination generally exclusive of infrared radiation prior to said flash illumination and said second summing step includes evaluating scene illumination including infrared radiation during a flash of illumination.

14. A method of exposing photographic film comprising the steps of:
    initiating an exposure interval during each part of which essentially the same given range of spectral frequencies are continuously transmitted from a scene to the focal plane by directing image forming light rays from the scene to be photographed along a given exposure path to photographic film material located at a given focal plane;
    summing scene illumination comprising a first step of summing first spectral frequencies during an initial portion of said exposure interval;
    directing a flash of illumination at said scene during the exposure interval;
    summing scene illumination comprising a second step of summing second spectral frequencies different from said first frequencies at least during said another portion of the exposure interval; and
    responsive to a total of both of said summing steps, blocking said given exposure path to terminate said exposure interval.

15. The method of claim 14 wherein the first summing step excludes infrared and the second summing step includes infrared frequencies.

16. The method of claim 14 wherein said illumination directing steps includes directing said pulse of illumination at said scene during only said another portion of said exposure interval.

17. The method of claim 16 wherein said first summing step includes evaluating scene illumination generally exclusive of infrared radiation prior to said flash illumination and said second summing step includes evaluating scene illumination including infrared radiation during said flash of illumination.

18. The method of claim 14 including a third summing step of summing scene illumination comprising said first spectral frequencies following said second summing step, and said blocking step is responsive to the total of all three of said summing steps.

19. In a photographic apparatus having means for directing image forming light rays from a scene along a given path to a photographic film material mounted at a given focal plane, means for evaluating radiation from said scene during an evaluation period, means for unblocking and blocking said path, and means responsive to said evaluation means for controlling said unblocking means to define an exposure interval, the improvement wherein said evaluating means includes:
    means for substantially precluding evaluation of selected spectral frequencies during one portion of the evaluation period while substantially permitting evaluation of said selected frequencies during at least another portion of said period; and
    means for producing a flash of illumination during said another portion of said period.

20. In a photographic apparatus having means for directing image forming light rays from a scene along a given path to a photographic film material mounted at a given focal plane, means for evaluating radiation from said scene during an evaluation period, means for unblocking and blocking said path, and means responsive to said evaluation means for controlling said unblocking means to define an exposure interval, the improvement wherein said evaluating means includes:
    means for substantially precluding evaluation of selected spectral frequencies during one portion of the evaluation period while substantially permitting evaluation of said selected frequencies during at least another portion of said period, and wherein said selected frequencies are infrared frequencies.

* * * * *